(12) United States Patent
Twelves, Jr. et al.

(10) Patent No.: US 10,914,320 B2
(45) Date of Patent: Feb. 9, 2021

(54) ADDITIVE MANUFACTURING PROCESS GROWN INTEGRATED TORSIONAL DAMPER MECHANISM IN GAS TURBINE ENGINE BLADE

(71) Applicant: United Technologies Corporation, Farmington, CT (US)

(72) Inventors: Wendell V. Twelves, Jr., Glastonbury, CT (US); Tracy A. Propheter-Hinckley, Manchester, CT (US); Pauline Cabrila, Bristol, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 847 days.

(21) Appl. No.: 15/112,032

(22) PCT Filed: Jan. 23, 2015

(86) PCT No.: PCT/US2015/012737
§ 371 (c)(1),
(2) Date: Jul. 15, 2016

(87) PCT Pub. No.: WO2015/112891
PCT Pub. Date: Jul. 30, 2015

(65) Prior Publication Data
US 2016/0341221 A1 Nov. 24, 2016

Related U.S. Application Data

(60) Provisional application No. 61/931,346, filed on Jan. 24, 2014.

(51) Int. Cl.
*F04D 29/66* (2006.01)
*F01D 5/16* (2006.01)
(Continued)

(52) U.S. Cl.
CPC .......... *F04D 29/668* (2013.01); *B22F 3/1055* (2013.01); *B22F 5/04* (2013.01);
(Continued)

(58) Field of Classification Search
CPC .... F04D 29/668; F04D 29/388; F04D 29/325; F01D 5/14; F01D 5/16; F05B 2220/302;
(Continued)

(56) References Cited

U.S. PATENT DOCUMENTS 1,833,751 A * 11/1931 Kimball .................. F01D 5/16
416/222
1,833,754 A * 11/1931 Paget ...................... F01D 5/16
416/215
(Continued)

FOREIGN PATENT DOCUMENTS

EP 2466072 A2 6/2012

OTHER PUBLICATIONS

EP search report for EP15740454.2 dated Feb. 9, 2017.

*Primary Examiner* — David E Sosnowski
*Assistant Examiner* — Wayne A Lambert
(74) *Attorney, Agent, or Firm* — Getz Balich LLC

(57) ABSTRACT

A blade is provided for a gas turbine engine. The blade includes an airfoil portion with at least one internal cavity and a damper located within the internal cavity. The damper includes a cantilever spring arm. A fan blade is provided for a gas turbine engine. The fan blade includes an airfoil portion with at least one internal cavity; and a damper located within the internal cavity. The damper includes a cantilever spring arm that terminates with a rub surface pad adjacent to a friction bridge between a concave pressure side and a convex suction side of the airfoil portion. A method is also provided for damping a blade of a gas turbine engine. The method includes deflecting a cantilever spring arm to
(Continued)

contact a rub surface pad with a friction bridge between a concave pressure side and a convex suction side of an airfoil portion of the blade.

20 Claims, 7 Drawing Sheets

(51) Int. Cl.
    *B22F 5/04*           (2006.01)
    *B22F 7/06*           (2006.01)
    *B22F 3/105*          (2006.01)
    *F04D 29/32*         (2006.01)
    *F04D 29/38*         (2006.01)

(52) U.S. Cl.
    CPC .................. *B22F 7/06* (2013.01); *F01D 5/16* (2013.01); *F04D 29/325* (2013.01); *F04D 29/388* (2013.01); *F05B 2220/302* (2013.01); *F05B 2230/31* (2013.01); *F05B 2230/60* (2013.01); *F05D 2230/22* (2013.01); *F05D 2230/30* (2013.01); *F05D 2230/31* (2013.01); *Y02P 10/25* (2015.11); *Y02T 50/60* (2013.01)

(58) Field of Classification Search
    CPC .............. F05B 2230/22; F05B 2230/60; F05B 2260/964; F05D 2230/22; F05D 2230/30; F05D 2230/31; F05D 2230/60; F05D 2260/96; Y02T 50/672; Y02P 10/29; Y02P 10/295; B22F 3/1055; B22F 5/04; B22F 7/06
    See application file for complete search history.

(56) References Cited

U.S. PATENT DOCUMENTS

| | | | |
|---|---|---|---|
| 2,642,263 A * | 6/1953 | Thorp | F01D 5/16 416/233 |
| 2,689,107 A * | 9/1954 | Odegaard | F01D 5/16 416/229 R |
| 2,828,941 A * | 4/1958 | Foley | F01D 5/16 416/231 R |
| 2,862,686 A * | 12/1958 | Bartlett | F01D 5/16 416/233 |
| 3,754,838 A * | 8/1973 | Fu | F01D 5/16 416/145 |
| 4,441,859 A * | 4/1984 | Sadler | F01D 5/16 416/145 |
| 4,460,314 A * | 7/1984 | Fuller | F01D 5/26 416/145 |
| 4,484,859 A * | 11/1984 | Pask | F01D 5/16 415/115 |
| 4,516,910 A * | 5/1985 | Bouiller | F01D 5/22 416/190 |
| 4,526,512 A * | 7/1985 | Hook | F01D 5/188 415/115 |
| 4,678,396 A * | 7/1987 | Mowill | F04D 29/464 138/45 |
| 5,165,860 A | 11/1992 | Stoner et al. | |
| 5,228,835 A * | 7/1993 | Chlus | F01D 5/22 416/193 A |
| 5,232,344 A * | 8/1993 | El-Aini | F01D 5/16 416/145 |
| 5,313,786 A * | 5/1994 | Chlus | F01D 5/22 415/119 |
| 5,407,321 A | 4/1995 | Rimkunas et al. | |
| 5,498,137 A * | 3/1996 | El-Aini | F01D 5/16 416/144 |
| 5,558,497 A | 9/1996 | Kraft et al. | |
| 5,820,343 A | 10/1998 | Kraft et al. | |
| 6,109,566 A * | 8/2000 | Miller | B64C 23/005 244/130 |
| 6,155,789 A | 12/2000 | Mannava et al. | |
| 6,283,707 B1 | 9/2001 | Chin | |
| 6,328,532 B1 * | 12/2001 | Hahnle | F01D 5/147 416/224 |
| 6,514,040 B2 | 2/2003 | Lewis et al. | |
| 6,827,551 B1 * | 12/2004 | Duffy | F01D 5/16 415/119 |
| 7,070,390 B2 * | 7/2006 | Powell | F01D 5/16 416/224 |
| 7,121,801 B2 * | 10/2006 | Surace | F01D 5/16 416/193 A |
| 7,125,225 B2 * | 10/2006 | Surace | F01D 5/16 416/96 R |
| 7,217,093 B2 * | 5/2007 | Propheter | F01D 5/16 416/500 |
| 7,413,405 B2 | 8/2008 | Busbey et al. | |
| 7,736,124 B2 | 6/2010 | Bauer et al. | |
| 7,762,773 B2 | 7/2010 | Liang | |
| 7,806,410 B2 | 10/2010 | El-Aini et al. | |
| 7,824,158 B2 | 11/2010 | Bauer et al. | |
| 8,066,479 B2 | 11/2011 | El-Aini et al. | |
| 8,105,039 B1 | 1/2012 | El-Aini et al. | |
| 8,123,489 B2 | 2/2012 | Udall et al. | |
| 8,366,391 B2 * | 2/2013 | Tsukagoshi | F01D 5/188 416/95 |
| 9,121,288 B2 * | 9/2015 | Campbell | F01D 5/16 |
| 9,334,740 B2 * | 5/2016 | Kellerer | F01D 5/16 |
| 2002/0164253 A1 | 11/2002 | von Flotow | |
| 2007/0081894 A1 | 4/2007 | Garner | |
| 2013/0276457 A1 * | 10/2013 | Houston | F01D 5/16 60/805 |
| 2013/0280045 A1 | 10/2013 | Dolansky et al. | |
| 2013/0294913 A1 * | 11/2013 | Campbell | F01D 5/16 416/145 |
| 2015/0052898 A1 * | 2/2015 | Erno | B29C 64/141 60/726 |
| 2016/0084089 A1 | 3/2016 | Blaney et al. | |
| 2016/0130957 A1 * | 5/2016 | Freeman | F01D 5/3061 416/193 R |
| 2016/0160651 A1 | 6/2016 | Houston et al. | |

* cited by examiner

ADDITIVE MANUFACTURING PROCESS GROWN INTEGRATED TORSIONAL DAMPER MECHANISM IN GAS TURBINE ENGINE BLADE

CROSS-REFERENCE TO RELATED APPLICATION

This application claims priority to PCT Patent Application No. PCT/US15/012737 filed Jan. 23, 2015 which claims priority to U.S. Patent Application No. 61/931,346 filed Jan. 24, 2014, which is are hereby incorporated herein by reference in their entireties.

BACKGROUND

The present disclosure relates to a gas turbine engine and, more particularly, to an airfoil therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Gas turbine engines typically have rows of circumferentially spaced airfoils mounted on respective rotor disks for rotation about an engine axis. Advanced configurations feature shroud-less hollow airfoils manufactured of lightweight materials. The airfoils are designed to high tolerances to accommodate significant operational requirements such as crosswinds and inlet distortion. These requirements result in airfoils that may be prone to high vibratory responses and possible aeroelastic instability within some operational speed ranges that may result in flutter. Airfoil flutter is the result of complex interactions between fluid flow, stiffness, and inertial forces on an airfoil. Every airfoil has a critical speed, beyond which flutter will occur.

To resist flutter, the airfoils are designed for sufficient torsional stiffness, bending stiffness, and structural damping to avoid excitation. However, airfoils stiff enough to provide adequate flutter margin may also result in an airfoil relative heavy in weight. Some airfoils also include dampers such as particle filled cavities, which, although at least partially effective, further increase airfoil weight.

SUMMARY

A blade for a gas turbine engine, according to one disclosed non-limiting embodiment of the present disclosure, includes an airfoil portion with at least one internal cavity. A damper is located within the internal cavity, where the damper includes a cantilever spring arm.

In a further embodiment of the present disclosure, the airfoil portion extends from a platform portion of a fan blade.

In a further embodiment of any of the foregoing embodiments of the present disclosure, the cantilever spring arm extends from a base between a concave pressure side and a convex suction side.

In a further embodiment of any of the foregoing embodiments of the present disclosure, the cantilever spring arm terminates with a rub surface pad.

In a further embodiment of any of the foregoing embodiments of the present disclosure, the rub surface pad is located adjacent to a friction bridge between the concave pressure side and the convex suction side.

In a further embodiment of any of the foregoing embodiments of the present disclosure, the rub surface pad is located between the friction bridge and a motion limit bridge between the concave pressure side and the convex suction side.

In a further embodiment of any of the foregoing embodiments of the present disclosure, a clip is removably mounted to at least one of the rub surface pad and the friction bridge.

In a further embodiment of any of the foregoing embodiments of the present disclosure, a clip is additively manufactured to the friction bridge. The clip is additively manufactured of a material different than the friction bridge.

In a further embodiment of any of the foregoing embodiments of the present disclosure, a clip is additively manufactured to the rub surface pad. The clip is additively manufactured of a material different than the rub surface pad.

A fan blade for a gas turbine engine, according to another disclosed non-limiting embodiment of the present disclosure, includes an airfoil portion with at least one internal cavity. A damper is located within the internal cavity, where the damper includes a cantilever spring arm that terminates with a rub surface pad adjacent to a friction bridge between a concave pressure side and a convex suction side of the airfoil portion.

In a further embodiment of any of the foregoing embodiments of the present disclosure, the cantilever spring arm extends from a base between a concave pressure side and a convex suction side.

In a further embodiment of any of the foregoing embodiments of the present disclosure, the rub surface pad is located between the friction bridge and a motion limit bridge between the concave pressure side and the convex suction side.

In a further embodiment of any of the foregoing embodiments of the present disclosure, the cantilever spring arm extends toward a leading edge of the airfoil portion.

In a further embodiment of any of the foregoing embodiments of the present disclosure, the cantilever spring arm extends toward a trailing edge of the airfoil portion.

A method of damping a blade of a gas turbine engine, according to another disclosed non-limiting embodiment of the present disclosure, includes deflecting a cantilever spring arm to contact a rub surface pad with a friction bridge between a concave pressure side and a convex suction side of an airfoil portion of the blade.

In a further embodiment of any of the foregoing embodiments of the present disclosure, the method includes deflecting the cantilever spring arm under a centrifugal load generated by rotation of the blade.

In a further embodiment of any of the foregoing embodiments of the present disclosure, the centrifugal load generated by rotation of the blade is on the order of about thirty and about sixty thousand Gs.

In a further embodiment of any of the foregoing embodiments of the present disclosure, the rub surface pad and the friction bridge include a fretting surface coating.

In a further embodiment of any of the foregoing embodiments of the present disclosure, the method includes additively manufacturing the concave pressure side and the convex suction side.

In a further embodiment of any of the foregoing embodiments of the present disclosure, the method includes additively manufacturing the cantilever spring arm and the friction bridge with the concave pressure side and the convex suction side.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
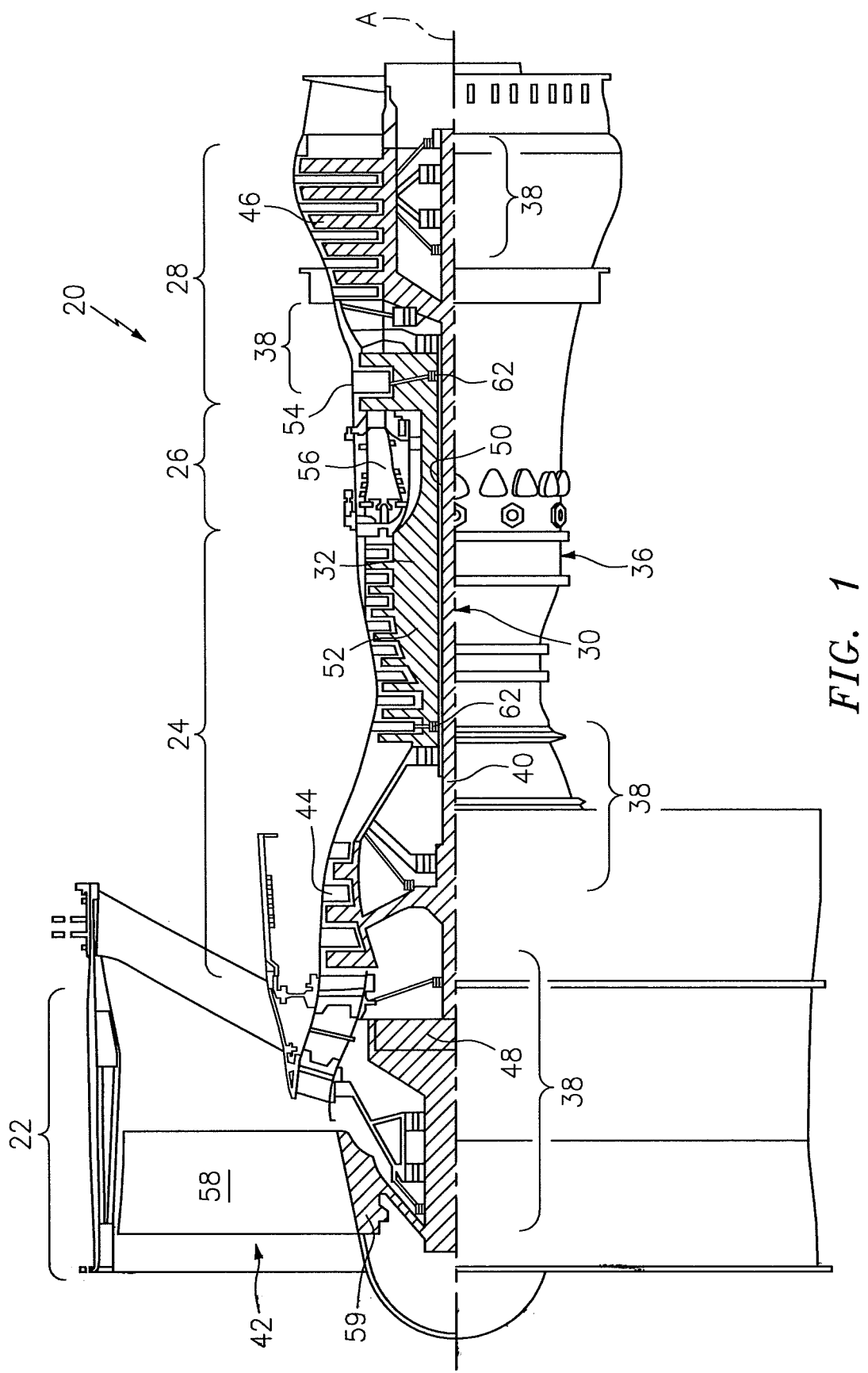
FIG. 1 is a schematic cross-section of an example gas turbine engine architecture.
Figure 2:
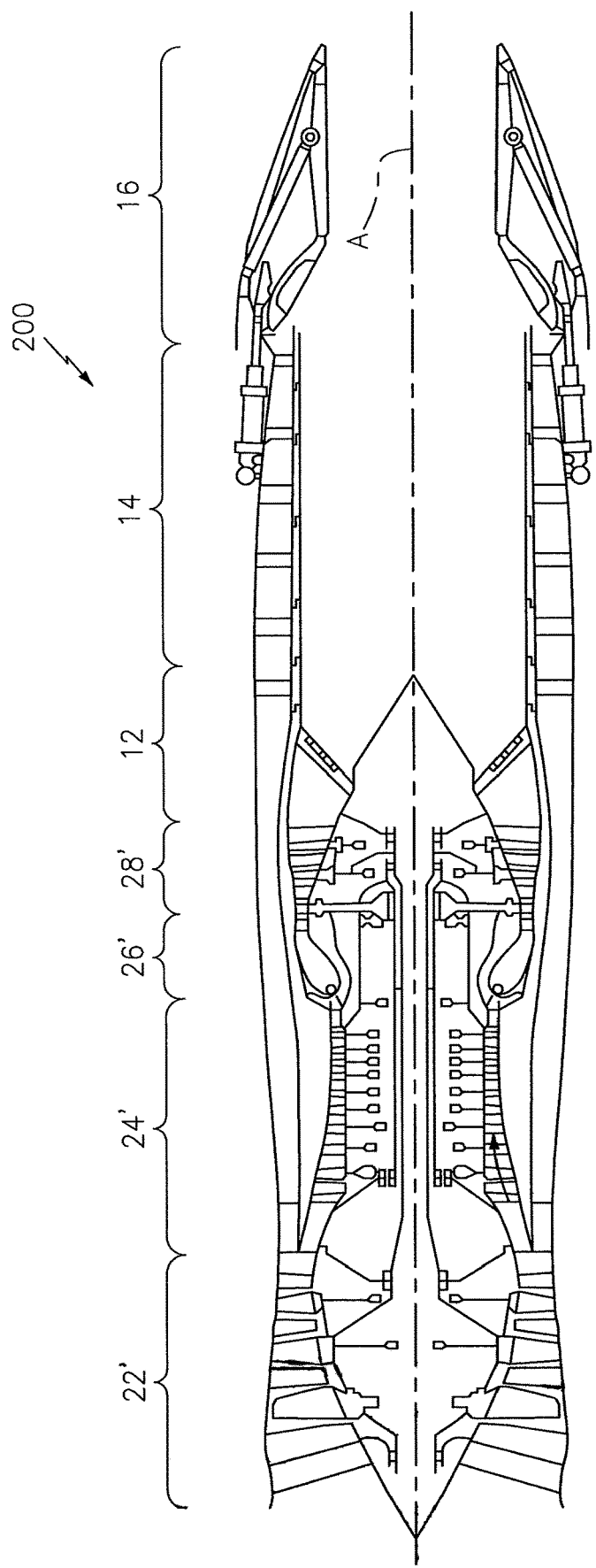
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (see FIG. 2) among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an Intermediate Pressure Compressor ("IPC") between a Low Pressure Compressor ("LPC") and a High Pressure Compressor ("HPC"), and an Intermediate Pressure Turbine ("IPT") between a High Pressure Turbine ("HPT") and the Low Pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

The fan section 22 includes a plurality of circumferentially spaced fan blades 58 which may be made of a high-strength, low weight material such as an aluminum alloy, titanium alloy, composite material or combinations thereof. It should be understood that although a single fan stage typical of a high bypass gas turbofan engine architecture is illustrated and described in the disclosed embodiment, other stages which have other blades inclusive but not limited to fan blades, high pressure compressor blades and low pressure compressor blades may also benefit herefrom.

Figure 3:
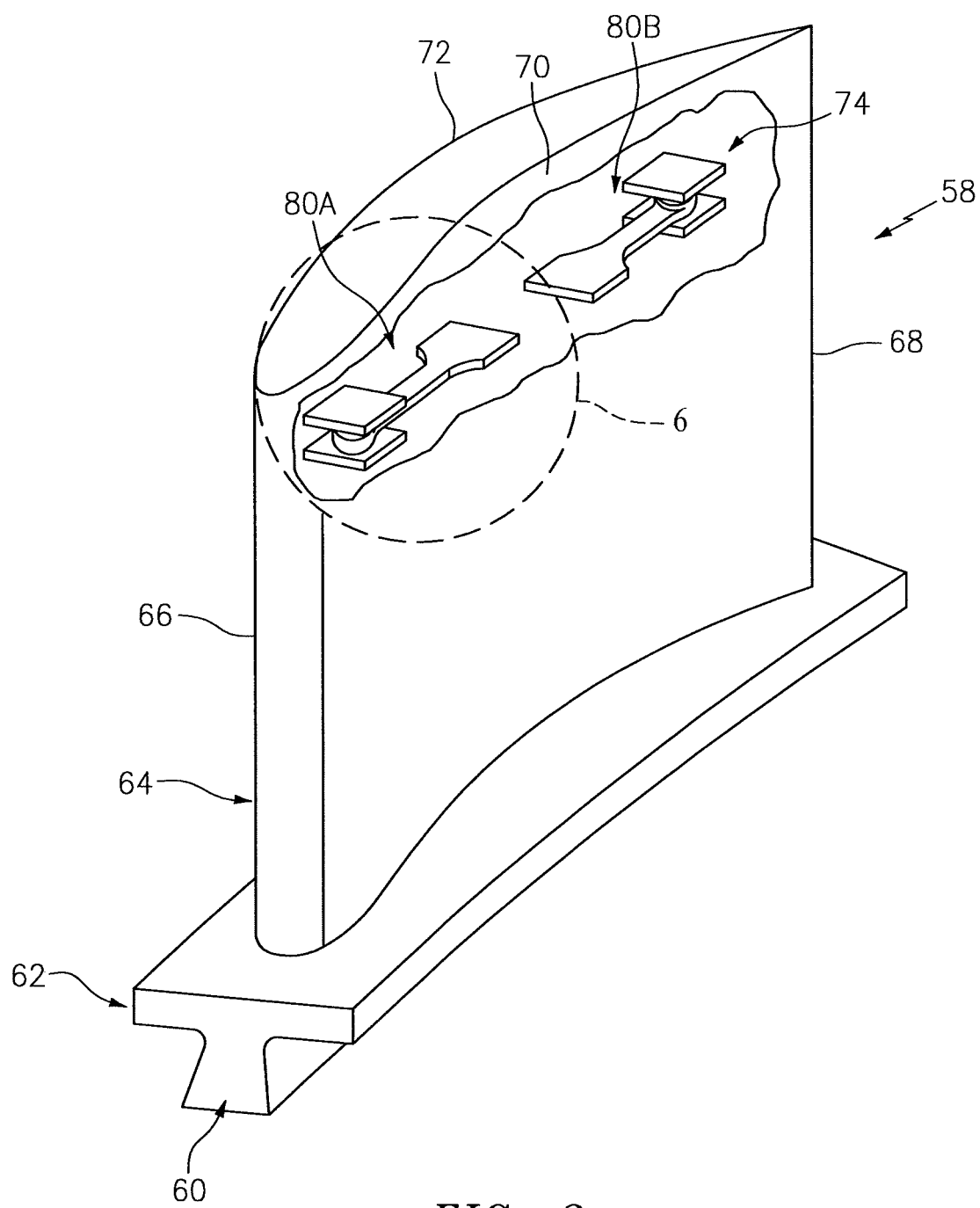
FIG. 3 is a schematic view of a fan blade with a damper according to one disclosed non-limiting embodiment.

With reference to FIG. 3, each fan blade 58 generally includes an innermost root portion 60, an intermediate platform portion 62, and an outermost airfoil portion 64. In one form, the root portion 60 defines an attachment such as an inverted "fir tree"-like shape, bulb, or dovetail so the fan blade 58 is slidably received in a complimentary configured recess provided in a fan rotor 59 (see FIG. 1). The platform portion 62 generally separates the root portion 60 and the airfoil portion 64 to define an inner boundary of the air flow path. The airfoil portion 64 defines a blade chord between a leading edge 66, which may include various forward and/or aft sweep configurations, and a trailing edge 68. A concave pressure side 70 and a convex suction side 72 are defined between the leading edge 66 and the trailing edge 68. Although a fan blade 58 is illustrated in the disclosed non-limiting embodiment, it should be understood that compressor blades, turbofan blades, turboprop propeller blades, tilt rotor props and other airfoils may benefit herefrom.

The airfoil portion 64 may be at least partially hollow within one or more internal cavities 74 that include a damper 80 (two shown as 80A, 80B). The fan blade 58 is typically manufactured in at least two sides such as the concave pressure side 70 and the convex suction side 72 which are assembled together to form the internal cavity 74 or may be readily manufactured with a rapid manufacturing processes such as Sterolithography (SLS), Direct Selective Laser Sintering (DSLS), Direct Metal Laser Sintering (DMLS), Electron Beam Sintering (EBS), Electron Beam Melting (EBM), Laser Engineered Net Shaping (LENS), Laser Net Shape Manufacturing (LNSM) and Direct Metal Deposition (DMD).

The additive manufacturing process sequentially builds-up layers of alloy and/or ceramic powder material such as, but not limited to, 625 Alloy, 718 Alloy, 230 Alloy, stainless steel, tool steel, cobalt chrome, titanium, nickel, aluminum and others in powder or wire material form. Alloys such as 625, 718 and 230 may be used for parts that operate in high temperature environments, such as, for example, environments typically encountered by aerospace and gas turbine engine components.

The additive manufacturing process facilitates manufacture of the relatively complex internal geometry to minimize assembly details and multi-component construction. The additive manufacturing process fabricates or "grows" components using three-dimensional information, for example, a three-dimensional computer model. The three-dimensional information is converted into a plurality of slices, each slice defining a cross section of the component for a predetermined height of the slice. The additive manufactured component is then "grown" slice by slice, or layer by layer, until finished. Each layer may be between about 0.0005-0.015 inches (0.0127-0.381 mm). Although particular additive manufacturing processes are disclosed, those skilled in the art of manufacturing will recognize that other suitable rapid manufacturing methods using layer-by-layer construction or additive fabrication can alternatively be used.

Figure 4:
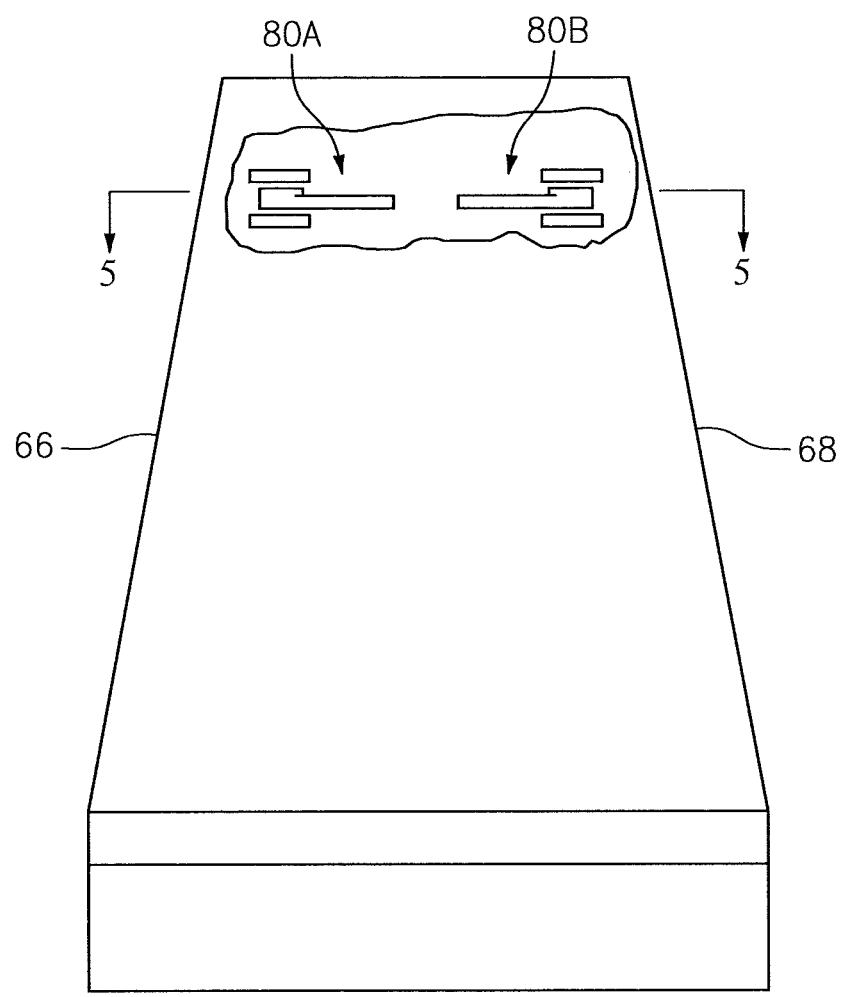
FIG. 4 is a side view of a fan blade with a damper according to one disclosed non-limiting embodiment.
Figure 5:
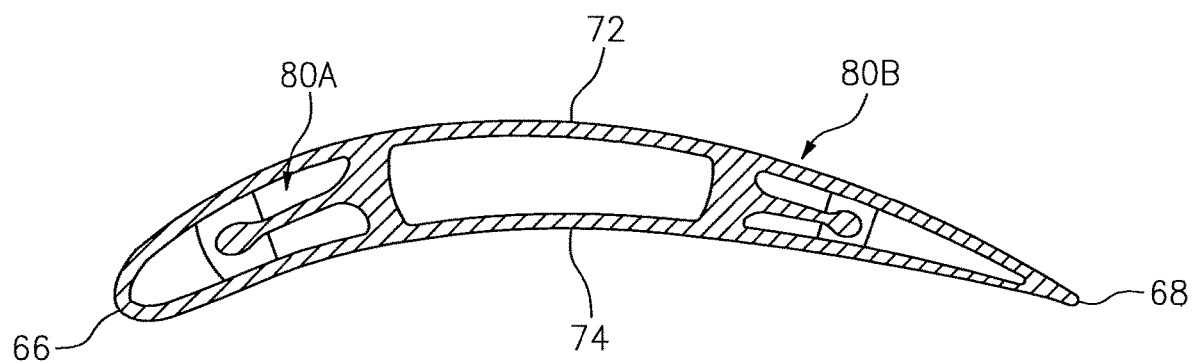
FIG. 5 is a sectional view of the fan blade along line 5-5 in FIG. 4.

The damper 80 (two shown as 80A, 80B) is located within the internal cavity 74. Generally, transverse and adjacent to the leading edge 66 and the trailing edge 68 (see FIGS. 4 and 5). Although a particular number, orientation and location for each damper 80 is illustrated, it should be appreciated that any number, orientation and location will also benefit herefrom. The damper 80 can be economically co-grown within the cavity 74 of the additively manufactured fan blade in a manner that will reduce the nominal stiffness requirement of the airfoil structure to provide adequate flutter margin.

Figure 6:
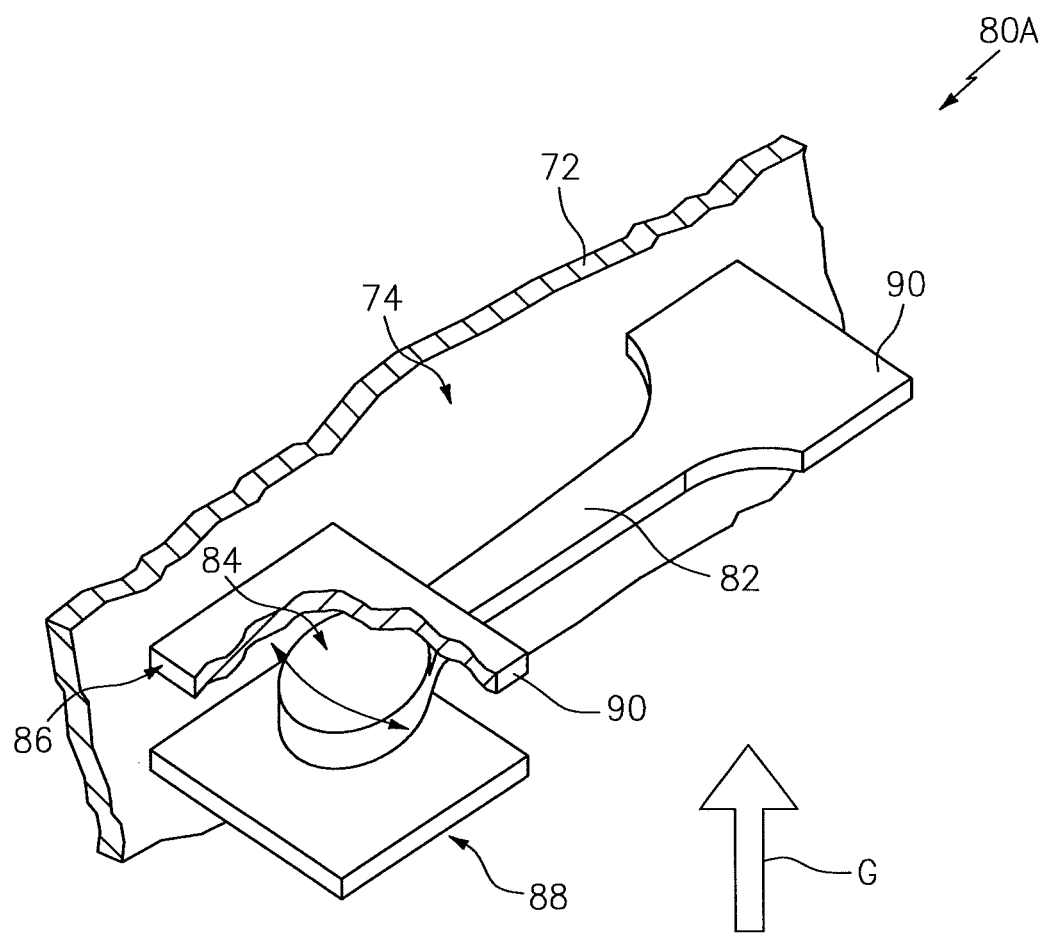
FIG. 6 is an expanded perspective view of a damper according to one disclosed non-limiting embodiment.

With reference to FIG. 6, in one non-limiting embodiment, each damper 80 generally includes a cantilever spring arm 82 that terminates with a friction head 84, a friction bridge 86 and a motion limit bridge 88. The cantilever spring arm 82 extends from a base 90 that extends across the cavity 74 between the concave pressure side 70 and the convex suction side 72. The friction bridge 86 and the motion limit bridge 88 extend between the concave pressure side 70 and the convex suction side 72 such that the rub surface pad 84 is located therebetween. The base 90, the friction bridge 86 and the motion limit bridge 88 may be integrated with the internal stiffening and shear web structure typical of a hollow metal fan blade. That is, the cantilever spring arm 82 may extend from otherwise existent and purposed structure.

The cantilever spring arm 82 is shaped, sized, and oriented to deflect under centrifugal G loading (illustrated schematically by arrow G) across a gap between the rub surface pad 84 and the friction bridge 86 when the fan blade is rotating during engine operation to allow the faying surfaces of the rub surface pad 84 to make contact at a desired contact force with the friction bridge 86. The fan blade 58, in one example, typically experiences between thirty and sixty thousand Gs and the spring rate of the cantilever spring arm 82 and the volume of the rub surface pad 84 at the end of the spring arm 82 may be tailored to provide the desired contact force at an operating speed of interest to provide torsional damping and thereby reduce flutter.

The rub surface pad 84 and the friction bridge 86 may be faced with fretting resistant coating 90 such as L 605 Cobalt alloy or Inconel 718 combinations that resist fretting to increase service life. The surface finish of the faying surfaces may additionally be tailored to the desired value during the growing process by laser glazing, mechanical metal working, or other methods.

Figure 7:
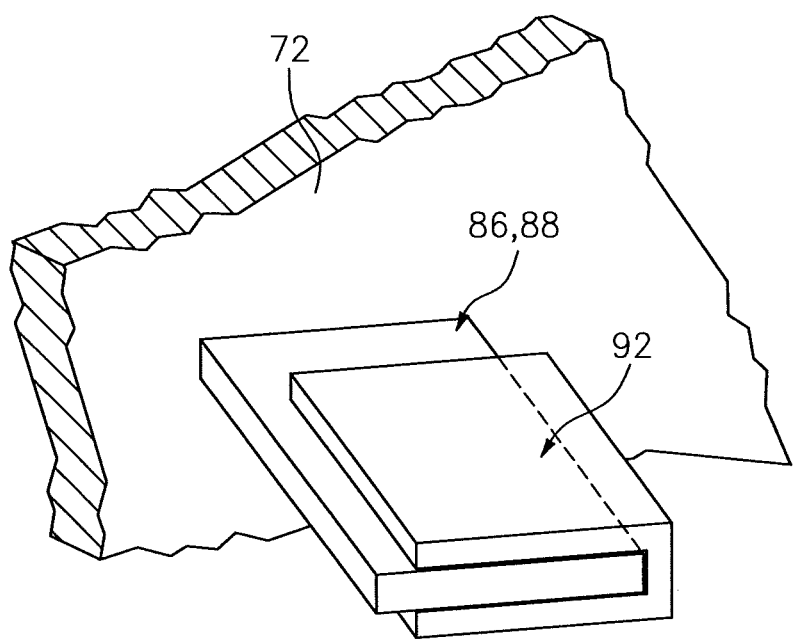
FIG. 7 is a schematic view of a removable clip for a friction bridge.

With reference to FIG. 7, in another disclosed non-limiting embodiment, either or both the rub surface pad 84 and the friction bridge 86 may receive a clip 92 that forms the rub surfaces. That is, the clip 92 forms a fretting resistant surface as well as facilitate maintenance over the surface life of the blade which may be on the order of sixty to eighty thousand hours. It should be appreciated that the clip 92 may be additively manufactured of a material different than the material to which it is attached. That is, the clip 92 may be additively manufactured in situ but of a different material.

Integration of friction dampers into the grown structure of an airfoil enables improved flutter margin at reduced weight and reduced cost. Exploiting the damper structure, especially the bridge structure operates to stiffen blade and shear between the airfoil surfaces and minimizes the weight impact of an integrated damper. Reduced stiffness requirements further result in relatively thinner walls that are lighter in weight.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations.

It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A blade for a gas turbine engine comprising:
an airfoil portion configured with a tip, a leading edge, a trailing edge, a concave pressure sidewall, a convex suction sidewall and at least one internal cavity formed by and extending laterally between the concave pressure sidewall and the convex section sidewall, the airfoil portion extending spanwise to the tip, and the airfoil portion extending longitudinally from the leading edge to the trailing edge; and
a damper located within the internal cavity, the damper including a friction bridge, a rub surface pad, a cantilever spring arm and a base that extends across the cavity from the concave pressure sidewall to the convex suction sidewall, the cantilever spring arm projecting longitudinally out from the base towards the leading edge or the trailing edge and to the rub surface pad, the rub surface pad located within the cavity adjacent the friction bridge, and the friction bridge extending laterally across the cavity between and connected to the concave pressure sidewall and the convex suction sidewall.

2. The blade as recited in claim 1, wherein the airfoil portion extends from a platform portion of a fan blade.

3. The airfoil as recited in claim 1, wherein the cantilever spring arm terminates with the rub surface pad.

4. The blade as recited in claim 1, wherein the damper further includes a motion limit bridge extending laterally across the cavity between and connected to the concave pressure sidewall and the convex suction sidewall, and the rub surface pad is located spanwise between the friction bridge and the motion limit bridge.

5. The blade as recited in claim 1, further comprising a clip removable mounted to at least one of the rub surface pad and the friction bridge.

6. The blade as recited in claim 1, further comprising a clip additively manufactured to the friction bridge, the clip additively manufactured of a material different than the friction bridge.

7. The blade as recited in claim 1, further comprising a clip additively manufactured to the rub surface pad, the clip additively manufactured of a material different than the rub surface pad.

8. The blade of claim 1, wherein the friction bridge is located spanwise between the rub surface pad and the tip.

9. The blade of claim 1, wherein the rub surface pad is configured to engage the friction bridge in a spanwise direction.

10. The blade of claim 1, wherein
the base is longitudinally separated from the airfoil portion at the leading edge by at least a first longitudinal gap; and
the base is longitudinally separated from the airfoil portion at the trailing edge by at least a second longitudinal gap.

11. The blade of claim 1, further comprising:
a second damper including a second friction bridge, a second rub surface pad, a second cantilever spring arm and a second base;
the second base extending from the concave pressure sidewall to the convex suction sidewall;
the second cantilever spring arm projecting longitudinally out from the second base towards the trailing edge and to the second rub surface pad, wherein the cantilever spring arm projects longitudinally out from the base towards the leading edge;
the second rub surface pad located adjacent the second friction bridge; and
the second friction bridge extending laterally between and connected to the concave pressure sidewall and the convex suction sidewall.

12. A fan blade for a gas turbine engine, comprising:
an airfoil portion configured with a tip, a leading edge, a trailing edge, a concave pressure sidewall, a convex suction sidewall and at least one internal cavity formed by and extending laterally between the concave pressure sidewall and the convex section sidewall, the airfoil portion extending spanwise to the tip, and the airfoil portion extending longitudinally from the leading edge to the trailing edge; and
a damper located within the internal cavity, the damper including a cantilever spring arm that terminates with a rub surface pad spanwise adjacent to a friction bridge that extends across the cavity from the concave pressure sidewall to the convex suction sidewall, wherein the rub surface pad is configured to engage the friction bridge in a spanwise direction.

13. The fan blade as recited in claim 12, wherein the cantilever spring arm extends from a base that extends between and is connected to the concave pressure sidewall and the convex suction sidewall.

14. The fan blade as recited in claim 12, wherein the rub surface pad is located spanwise between the friction bridge and a motion limit bridge between the concave pressure sidewall and the convex suction sidewall.

15. A method of damping a blade of a gas turbine engine, the method comprising:
deflecting a cantilever spring arm in a spanwise direction towards a tip of the blade to contact a rub surface pad with a friction bridge that extends, across a cavity in an airfoil portion of the blade, from a concave pressure sidewall to a convex suction sidewall of the airfoil portion of the blade such that the friction bridge is connected to the concave pressure sidewall and the convex suction sidewall.

16. The method as recited in claim 15, further comprising deflecting the cantilever spring arm under a centrifugal load generated by rotation of the blade.

17. The method as recited in claim 16, wherein the centrifugal load generated by rotation of the blade is on the order of about thirty and about sixty thousand Gs.

18. The method as recited in claim 16, wherein the rub surface pad and the friction bridge include a fretting surface coating.

19. The method as recited in claim 15, further comprising additively manufacturing the concave pressure sidewall and the convex suction sidewall.

20. The method as recited in claim 19, further comprising additively manufacturing the cantilever spring arm and the friction bridge with the concave pressure sidewall and the convex suction sidewall.

* * * * *